United States Patent
Alshinnawi et al.

(10) Patent No.: US 9,430,306 B2
(45) Date of Patent: *Aug. 30, 2016

(54) ANTICIPATORY PROTECTION OF CRITICAL JOBS IN A COMPUTING SYSTEM

(71) Applicant: LENOVO ENTERPRISE SOLUTIONS (SINGAPORE) PTE. LTD., Singapore (SG)

(72) Inventors: Shareef F. Alshinnawi, Durham, NC (US); Gary D. Cudak, Creedmoor, NC (US); Edward S. Suffern, Chapel Hill, NC (US); J. Mark Weber, Wake Forest, NC (US)

(73) Assignee: Lenovo Enterprise Solutions (Singapore) Pte. Ltd., Singapore (SG)

(*) Notice: Subject to any disclaimer, the term of this patent is extended or adjusted under 35 U.S.C. 154(b) by 196 days.

This patent is subject to a terminal disclaimer.

(21) Appl. No.: 14/048,868

(22) Filed: Oct. 8, 2013

(65) Prior Publication Data

US 2015/0100816 A1    Apr. 9, 2015

(51) Int. Cl.
G06F 11/00    (2006.01)

(52) U.S. Cl.
CPC ............ *G06F 11/004* (2013.01); *G06F 11/006* (2013.01)

(58) Field of Classification Search
CPC .. G06F 11/203; G06F 9/5027; G06F 11/006; G06F 11/004
See application file for complete search history.

(56) References Cited

U.S. PATENT DOCUMENTS

| | | | |
|---|---|---|---|
| 6,918,051 B2 | 7/2005 | Block et al. | |
| 7,203,944 B1 * | 4/2007 | van Rietschote et al. | .... 718/104 |
| 7,773,510 B2 | 8/2010 | Back et al. | |
| 7,971,094 B1 | 6/2011 | Benn et al. | |
| 7,996,507 B2 | 8/2011 | Larkin | |
| 8,156,490 B2 * | 4/2012 | Bozek et al. | ...... 718/1 |
| 8,266,622 B2 | 9/2012 | Cardelli | |
| 8,369,968 B2 | 2/2013 | Brown et al. | |
| 8,745,230 B2 | 6/2014 | Hayward | |

(Continued)

OTHER PUBLICATIONS

Xu, P., et al., "Enabling Cloud Storage to Support Traditional Applications". 2010 Fifth Annual ChinaGrid Conference, Jul. 16-18, 2010, pp. 167-172, Conference Publication, DOI: 10.1109/ChinaGrid.2010.50.

(Continued)

*Primary Examiner* — Loan L. T. Truong
(74) *Attorney, Agent, or Firm* — Edward J. Lenart; Katherine S. Brown; Kennedy Lenart Spraggins LLP

(57) ABSTRACT

Anticipatory protection of critical jobs in a computing system, including: identifying, by a system management module, a problem computing component in the computing system; identifying, by the system management modules, all proximate computing components in the computing system, wherein each proximate computing component is within a predetermined physical proximity of the problem computing component; determining, by the system management module, whether the proximate computing components are executing one or more critical jobs; and responsive to determining that the proximate computing components are executing one or more critical jobs migrating, by the system management module, the one or more critical jobs to distant computing components in the computing system, wherein each distant computing component is not within the predetermined physical proximity of the problem computing component.

13 Claims, 4 Drawing Sheets

(56) References Cited

U.S. PATENT DOCUMENTS

| | | | |
|---|---|---|---|
| 8,935,563 B1* | 1/2015 | Rajaa et al. | 714/4.11 |
| 9,141,487 B2 | 9/2015 | Jagtiani et al. | |
| 9,202,167 B1* | 12/2015 | Chamness | G06N 99/005 |
| 2005/0114739 A1* | 5/2005 | Gupta | G06F 11/008 |
| | | | 714/39 |
| 2005/0228947 A1 | 10/2005 | Morita et al. | |
| 2005/0251802 A1* | 11/2005 | Bozek et al. | 718/1 |
| 2007/0011499 A1 | 1/2007 | Bergsten et al. | |
| 2007/0061180 A1 | 3/2007 | Offenberg | |
| 2007/0233698 A1 | 10/2007 | Sundar et al. | |
| 2008/0155091 A1* | 6/2008 | Gokhale et al. | 709/224 |
| 2008/0256223 A1* | 10/2008 | Chan | H04L 67/1008 |
| | | | 709/223 |
| 2010/0054183 A1* | 3/2010 | Shin et al. | 370/328 |
| 2011/0264939 A1* | 10/2011 | Wong | G06F 1/3203 |
| | | | 713/323 |
| 2011/0320828 A1 | 12/2011 | Boss et al. | |
| 2012/0072765 A1* | 3/2012 | Bower, III | G06F 11/1666 |
| | | | 714/3 |
| 2012/0159052 A1 | 6/2012 | Lee et al. | |
| 2012/0290874 A1 | 11/2012 | Bower, III et al. | |
| 2012/0311377 A1* | 12/2012 | Blood | G06F 9/06 |
| | | | 714/4.12 |
| 2013/0073717 A1 | 3/2013 | Collin et al. | |
| 2013/0166948 A1 | 6/2013 | Branson et al. | |
| 2013/0290957 A1* | 10/2013 | Li et al. | 718/1 |
| 2014/0032960 A1 | 1/2014 | Konishi | |
| 2014/0096139 A1 | 4/2014 | Alshinnawi et al. | |
| 2014/0181825 A1* | 6/2014 | He | G06F 9/5027 |
| | | | 718/102 |
| 2014/0298349 A1* | 10/2014 | Jackson | G06Q 50/06 |
| | | | 718/104 |
| 2014/0317625 A1* | 10/2014 | Ichikawa et al. | 718/1 |
| 2014/0379895 A1 | 12/2014 | Jain | |
| 2015/0052531 A1* | 2/2015 | Helak | G06F 9/4856 |
| | | | 718/102 |

OTHER PUBLICATIONS

Lo, J., et al., "Active Nodal Task Seeking (ANTS): An Approach to High-Performance, Ultradependable Computing", IEEE Transactions on Aerospace and Electronic Systems, vol. 31, Issue 3, Jul. 1995, p. 987-997, IEEE, DOI: 10.1109/7.395241.

Wang, X., et al., "An approximation scheme for two-machine flowshop scheduling with setup times and an availability constraint", Computers & Operations Research Archive, Oct. 2007, pp. 2894-2901, vol. 34 Issue 10, Elsevier Science Ltd. Oxford, UK, DOI: 10.1016/j.cor.2005.11.019.

\* cited by examiner

ANTICIPATORY PROTECTION OF CRITICAL JOBS IN A COMPUTING SYSTEM

BACKGROUND OF THE INVENTION

1. Field of the Invention

The field of the invention is data processing, or, more specifically, methods, apparatus, and products for anticipatory protection of critical jobs in a computing system.

2. Description Of Related Art

Modern computing systems can include a group of machines that are located within close proximity of each other. For example, modern computing systems can include a group of blade servers located within a single blade rack. In such computing systems, when one server fails or otherwise is operating in a non-optimal condition, a technician may be dispatched to troubleshoot and repair such a server. In the process of servicing such a server, the technician may inadvertently impact the operation of other physically proximate servers, for example, by bumping a physically proximate server, pulling an improper cable, shutting down a power supply that provide power to multiple servers, tampering with a storage controller, and so on. Such actions may negatively impact the execution of critical jobs on servers that are physically proximate to the server being serviced.

SUMMARY OF THE INVENTION

Methods, apparatuses, and products for anticipatory protection of critical jobs in a computing system, including: identifying, by a system management module, a problem computing component in the computing system; identifying, by the system management modules, all proximate computing components in the computing system, wherein each proximate computing component is within a predetermined physical proximity of the problem computing component; determining, by the system management module, whether the proximate computing components are executing one or more critical jobs; and responsive to determining that the proximate computing components are executing one or more critical jobs migrating, by the system management module, the one or more critical jobs to distant computing components in the computing system, wherein each distant computing component is not within the predetermined physical proximity of the problem computing component.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
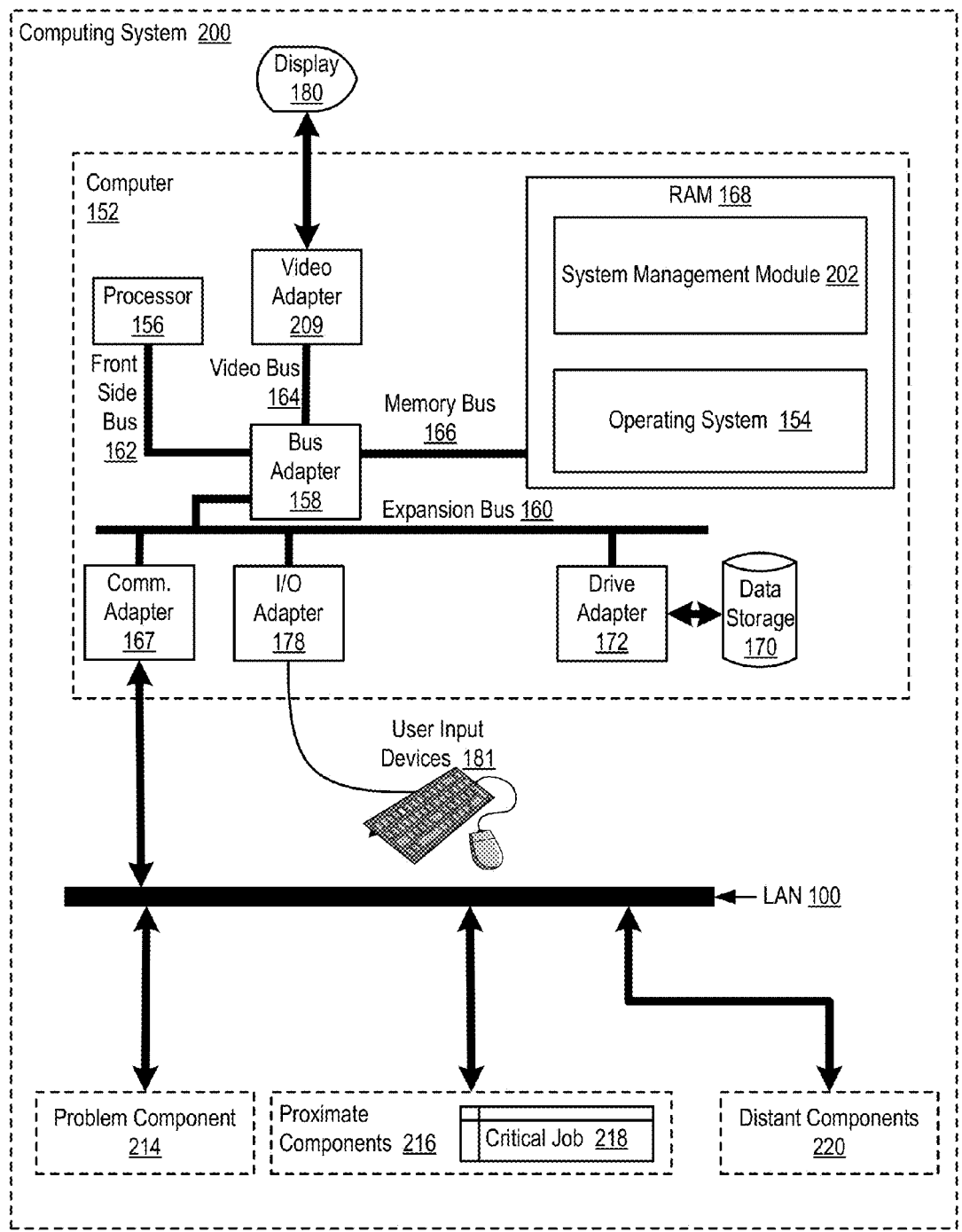
FIG. 1 sets forth a block diagram of automated computing machinery comprising an example computer useful in the anticipatory protection of critical jobs in a computing system according to embodiments of the present invention.

Example methods, apparatuses, and products for anticipatory protection of critical jobs in a computing system in accordance with the present invention are described with reference to the accompanying drawings, beginning with FIG. 1. FIG. 1 sets forth a block diagram of automated computing machinery comprising an example computer (152) useful in anticipatory protection of critical jobs in a computing system (200) according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a system management module (202), a module of computer program instructions improved for anticipatory protection of critical jobs in a computing system (200) according to embodiments of the present invention. The system management module (202) of FIG. 1 can be configured to perform anticipatory protection of critical jobs by identifying a problem computing component (214) in the computing system (200). The problem computing component (214) of FIG. 1 represents a computing component that has failed, is a candidate for failure, or otherwise is in need of servicing. A computing component may be identified as a problem computing component (214) because the computing component has become unresponsive, because the computing component has generated error warnings, because the computing component is operating in a state that can lead to damage (e.g., the computing component is operating at a temperature that can lead to damage), and so on. In such a way, the problem computing component (214) has some reliability issues and may need to be serviced at some point in the near future.

Figure 2:
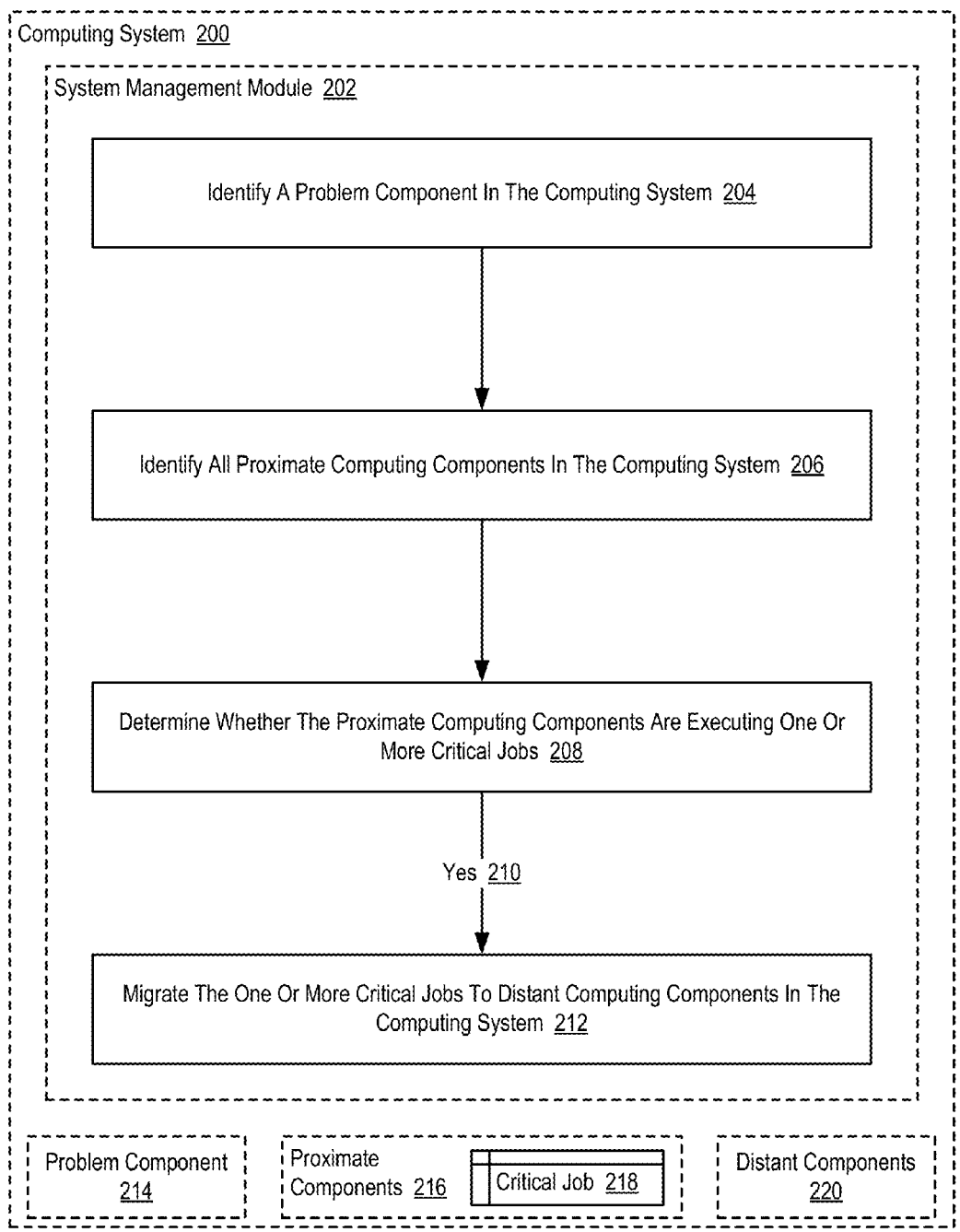
FIG. 2 sets forth a flow chart illustrating an example method for anticipatory protection of critical jobs in a computing system according to embodiments of the present invention.

The system management module (202) of FIG. 1 can further be configured to perform anticipatory protection of critical jobs by identifying all proximate computing components (216) in the computing system (200). Each proximate computing component (216) of FIG. 2 is within a predetermined physical proximity of the problem computing component (214), or is otherwise logically proximate to the problem computing component as will be explained later in greater detail. The predetermined proximity to the problem computing component (214) may be expressed in many different ways. For example, the predetermined physical proximity may be expressed in terms of a distance between the proximate computing components (216) and the problem computing component (214). In addition, computing components (216) may be 'proximate' to the problem computing component (214) when the computing components (216) and the problem computing component (214) are within slots in a rack that are known to be within a predetermined physical distance, such that knowing the position of the problem computing component (214) within a rack and knowing the position of other computing components (216, 220) is sufficient for determining whether the other computing components (216, 220) are proximate to the problem computing component (214).

The system management module (202) of FIG. 1 can further be configured to perform anticipatory protection of critical jobs by determining whether the proximate computing components (216) are executing one or more critical jobs (218). The critical jobs (218) of FIG. 1 represent jobs that are of high importance and that should continue execution if at all possible. Consider an example in which the computing system (200) supports the online operations of a bank. In such an example, jobs that facilitate financial transactions may be considered to be more critical than jobs which perform a nightly backup of customer profiles, as the inability of a bank to perform financial transactions would greatly hinder the bank's ability to perform its core business function. In such a way, jobs may be assigned criticality levels (e.g., high, medium, low) by a system administrator, software developer, or other entity such that the relative importance of each job can be determined. In such an example, determining whether the proximate computing components (216) are executing one or more critical jobs (218) may be carried out, for example, by the system management module (202) polling each proximate computing component (216) for a list of jobs being executed by the proximate computing component (216) as well as a criticality level for each job. Those jobs with a criticality level over a predetermined threshold may be identified as being critical jobs (218).

The system management module (202) of FIG. 1 can further be configured to perform anticipatory protection of critical jobs by migrating the one or more critical jobs (218) to one or more distant computing components (220) in the computing system (200). Each distant computing component (220) of FIG. 1 represents a computing component that is not within the predetermined physical proximity of the problem computing component (216). Migrating the one or more critical jobs (218) to one or more distant computing components (220) in the computing system (200) may be carried out, for example, by pausing execution of the critical jobs (218) on the proximate computing components (216), copying application variables and other execution parameters associated with the one or more critical jobs (218), writing the application environment associated with the one or more critical jobs (218) to memory in the one or more distant computing components (220), and resuming execution of the one or more critical jobs (218) at the point at which execution was halted on the proximate computing components (216). Migrating the one or more critical jobs (218) to one or more distant computing components (220) in the computing system (200) is carried out in response to affirmatively determining that the proximate computing components (216) are executing one or more critical jobs (218).

Also stored in RAM (168) is an operating system (154). Operating systems useful anticipatory protection of critical jobs in a computing system (200) according to embodiments of the present invention include UNIX™, Linux™, Microsoft XP™, AIX™, IBM's i5/OS™, and others as will occur to those of skill in the art. The operating system (154) and the system management module (202) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for anticipatory protection of critical jobs in a computing system (200) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for anticipatory protection of critical jobs in a computing system (200) according to embodiments of the present invention include modems for wired dial-up communications, Ethernet (IEEE 802.3) adapters for wired data communications network communications, and 802.11 adapters for wireless data communications network communications.

For further explanation, FIG. 2 sets forth a flow chart illustrating an example method for anticipatory protection of critical jobs (218) in a computing system (200) according to embodiments of the present invention. The computing system (200) of FIG. 2 may be embodied, for example, as a computing system that includes a plurality of computing components such as servers, blade servers, standalone computers, and so on. For example, the computing system (200) of FIG. 2 may be embodied as a blade center that includes a plurality of blade servers, storage devices, power supplies, and other computing components that may be coupled for data communications via a data communications network. In the example method of FIG. 2, the computing system can include one or more management modules for monitoring and managing computing components within the computing system (200).

The example method of FIG. 2 is carried out, at least in part, by a system management module (202). The system management module (202) of FIG. 2 may be embodied as one or more modules of computer program instructions executing on computer hardware. The system management module (202) of FIG. 2 may be embodied, for example, as computer program instructions stored within computer memory in a dedicated blade server and executing on computer hardware in the dedicated blade server. In such an example, the dedicated blade server that supports the system management module (202) may be coupled for data communications with the other computing components (214, 216, 220) in the computing system (200) via a data communications network (not shown).

The example method of FIG. 2 includes identifying (204), by a system management module (202), a problem computing component (214) in the computing system (200). In the example method of FIG. 2, a problem computing component (214) represents a computing component that has failed, is a candidate for failure, or otherwise is in need of servicing. A computing component may be identified (204) as a problem computing component (214) because the computing component has become unresponsive, because the computing component has generated error warnings, because the computing component is operating in a state that can lead to damage (e.g., the computing component is operating at a temperature that can lead to damage), and so on. In such a way, the problem computing component (214) has some reliability issues and may need to be serviced at some point in the near future.

The example method of FIG. 2 also includes identifying (206), by the system management modules (202), all proximate computing components (216) in the computing system (200). In the example method of FIG. 2, each proximate computing component (216) is within a predetermined physical proximity of the problem computing component (214). The predetermined physical proximity may be expressed in many different ways. For example, the predetermined physical proximity may be expressed in terms of a distance between the proximate computing components (216) and the problem computing component (214). In addition, computing components (216) may be 'proximate' to the problem computing component (214) when the computing components (216) and the problem computing component (214) are within slots in a rack that are known to be within a predetermined physical distance, such that knowing the position of the problem computing component (214) within a rack and knowing the position of other computing components (216, 220) is sufficient for determining whether the other computing components (216, 220) are proximate to the problem computing component (214).

The example method of FIG. 2 also includes determining (208), by the system management module (202), whether the proximate computing components (216) are executing one or more critical jobs (218). In the example method of FIG. 2, critical jobs (218) represent jobs that are of high importance and that should continue execution if at all possible. Consider an example in which the computing system (200) supports the online operations of a bank. In such an example, jobs that facilitate financial transactions may be considered to be more critical than jobs which perform a nightly backup of customer profiles, as the inability of a bank to perform financial transactions would greatly hinder the bank's ability to perform its core business function. In such a way, jobs may be assigned criticality levels (e.g., high, medium, low) by a system administrator, software developer, or other entity such that the relative importance of each job can be determined. In such an example, determining (208) whether the proximate computing components (216) are executing one or more critical jobs (218) may be carried out, for example, by the system management module (202) polling each proximate computing component (216) for a list of jobs being executed by the proximate computing component (216) as well as a criticality level for each job. Those jobs with a criticality level over a predetermined threshold may be identified as being critical jobs (218).

The example method of FIG. 2 also includes migrating (212), by the system management module (202), the one or more critical jobs (218) to one or more distant computing components (220) in the computing system (200). In the example method of FIG. 2, each distant computing component (220) represents a computing component that is not within the predetermined physical proximity of the problem computing component (216). Migrating (212) the one or more critical jobs (218) to one or more distant computing components (220) in the computing system (200) may be carried out, for example, by pausing execution of the critical jobs (218) on the proximate computing components (216), copying application variables and other execution parameters associated with the one or more critical jobs (218), writing the application environment associated with the one or more critical jobs (218) to memory in the one or more distant computing components (220), and resuming execution of the one or more critical jobs (218) at the point at which execution was halted on the proximate computing components (216). In the example method of FIG. 2, migrating (212) the one or more critical jobs (218) to one or more distant computing components (220) in the computing system (200) is carried out in response to affirmatively (210) determining that the proximate computing components (216) are executing one or more critical jobs (218).

Figure 3:
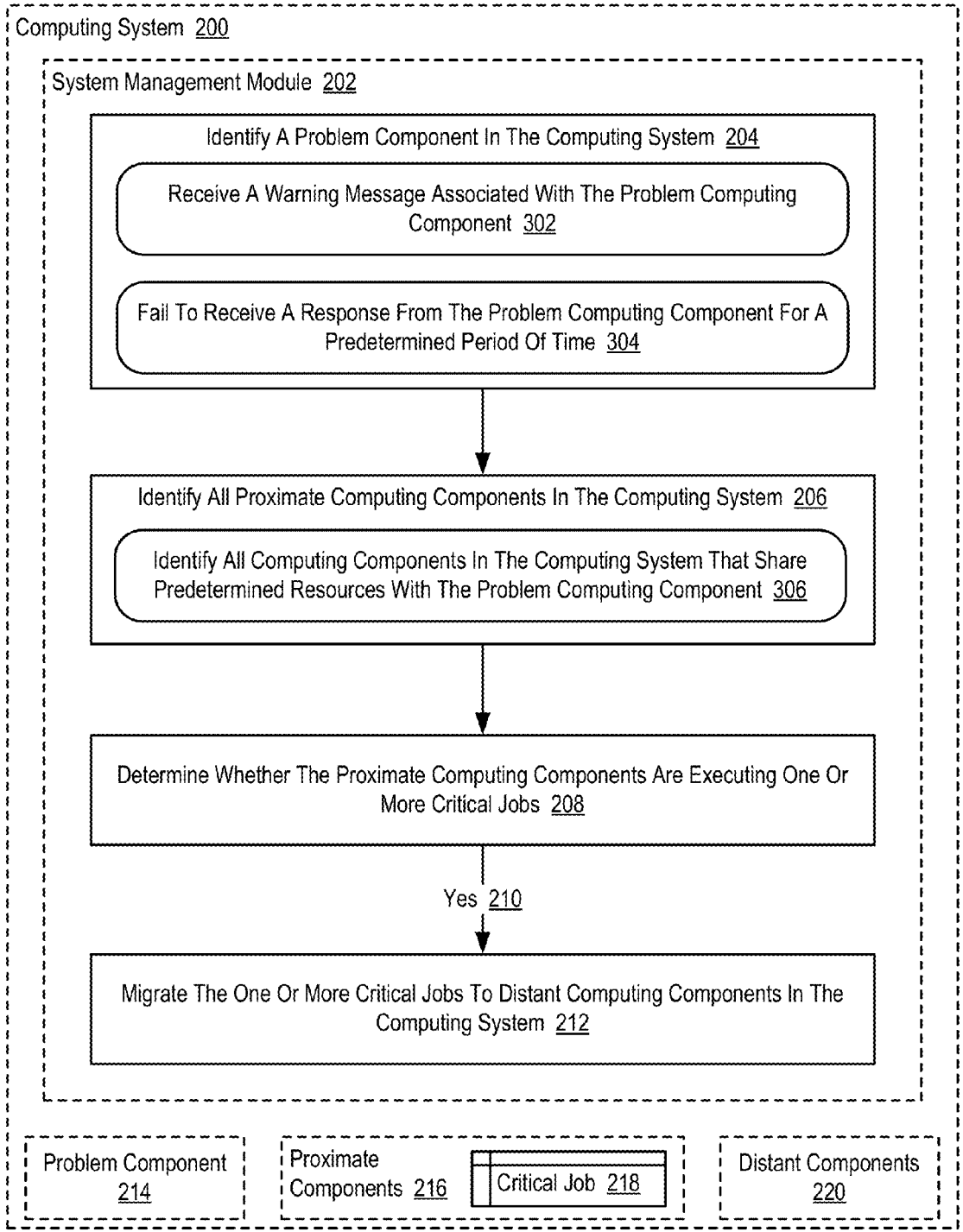
FIG. 3 sets forth a flow chart illustrating an additional example method for anticipatory protection of critical jobs in a computing system according to embodiments of the present invention.

For further explanation, FIG. 3 sets forth a flow chart illustrating an example method for anticipatory protection of critical jobs (218) in a computing system (200) according to embodiments of the present invention. The example method of FIG. 3 is similar to the example method of FIG. 2, as it also includes identifying (204) a problem computing component (214) in the computing system (200), identifying (206) all proximate computing components (216) in the computing system (200), determining (208) whether the proximate computing components (216) are executing one or more critical jobs (218), and migrating (212) the one or more critical jobs (218) to one or more distant computing components (220) in the computing system (200).

In the example method of FIG. 3, identifying (204) a problem computing component (214) in the computing system (200) can include receiving (302) a warning message associated with the problem computing component (214). A warning message associated with the problem computing component (214) may be issued by the problem computing component (214), however, such a warning message associated with the problem computing component (214) may also be issued by another computing component in the computing system (200). For example, a network switch that is attempting to send data to the problem computing component (214) may generate a warning message indicating that the problem computing component (214) could not be reached for the delivery of data. In the example method of FIG. 3, the warning message associated with the problem computing component (214) may include an identification of the nature of the problem, an identification of component parts of the problem computing component (214) that are not operating as expected, and so on. Such a warning message associated with the problem computing component (214) may be received (302) by the system management module (202), for example, by the system management module (202) periodically polling all computing components for errors and warnings, by the system management module (202) periodically examining error logs for the computing components, by the computing components proactively notifying the system management module (202) of an error condition, and so on.

In the example method of FIG. 3, identifying (204) a problem computing component (214) in the computing system (200) can alternatively include failing (304) to receive a response from the problem computing component (214) for a predetermined period of time. In the example method of FIG. 3, the system management module (202) may periodically send a message to all computing components requesting information associated with the health of the computing component. Likewise, the system management module (202) may send many other types of messages to each of the computing components. In such an example, when the system management module (202) fails (304) to receive a response to such messages from the problem computing component (214), after a predetermined period of time the system management module (202) can conclude that the problem computing component (214) is experiencing problems.

In the example method of FIG. 3, identifying (204) a problem computing component (214) in the computing system (200) can alternatively include identifying (306) all computing components in the computing system (200) that share predetermined resources with the problem computing component (214). Consider an example in which a blade server in a blade center has been identified (204) as a problem computing component (214). In such an example, the problem computing component (214) may be powered by a shared power supply that also provides power to other blade servers in the blade center. In order for a technician to perform maintenance operations on the problem computing component (214), the shared power supply may need to be turned off, thereby halting the delivery of power to the other blade servers that are powered by the shared power supply. In such an example, all blade servers that are powered by the shared power supply may be identified (306) as being logically proximate to the problem computing component (214) as performing maintenance operations on the problem computing component (214) may cause the blade servers that are powered by the shared power supply to become non-operational. In the example method of FIG. 3, the relevant predetermined resources that are shared with the problem computing component (214) may be specified by a system administrator, by a system management module (202), and so on.

Figure 4:
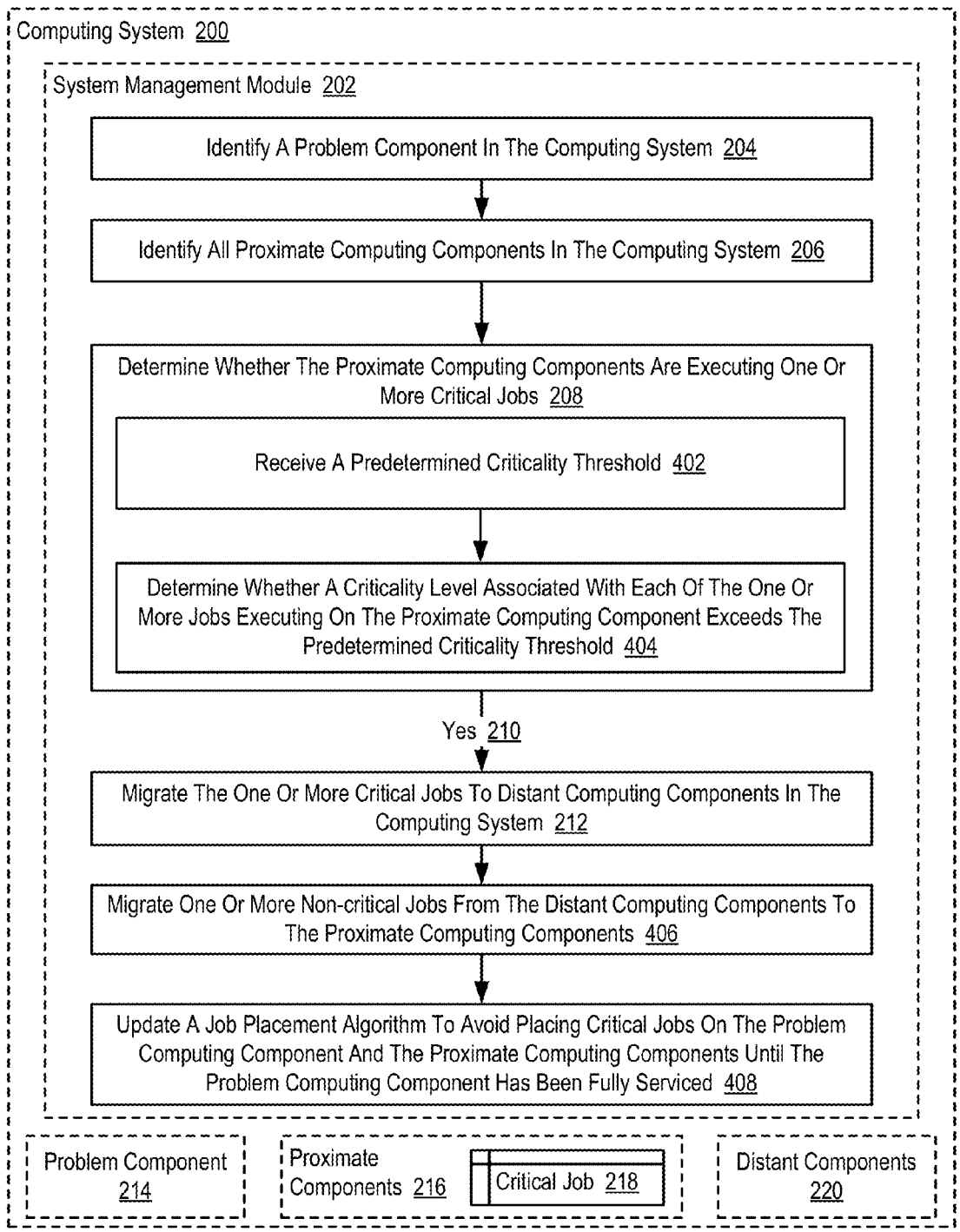
FIG. 4 sets forth a flow chart illustrating an additional example method for anticipatory protection of critical jobs in a computing system according to embodiments of the present invention.

For further explanation, FIG. 4 sets forth a flow chart illustrating an example method for anticipatory protection of critical jobs (218) in a computing system (200) according to embodiments of the present invention. The example method of FIG. 4 is similar to the example method of FIG. 2, as it also includes identifying (204) a problem computing component (214) in the computing system (200), identifying (206) all proximate computing components (216) in the computing system (200), determining (208) whether the proximate computing components (216) are executing one or more critical jobs (218), and migrating (212) the one or more critical jobs (218) to one or more distant computing components (220) in the computing system (200).

In the example method of FIG. 4, determining (208) whether the proximate computing components (216) are executing one or more critical jobs (218) can include receiving (402), by the system management module (202), a predetermined criticality threshold. In the example method of FIG. 4, the predetermined criticality threshold can be used to distinguish critical jobs (218) from non-critical jobs, as all jobs with a criticality value equal to or above the predetermined criticality threshold are deemed to be critical and all jobs with a criticality value below the predetermined criticality threshold are deemed to be non-critical jobs. In such an example, the predetermined criticality threshold may be set as a default value, set by a system administrator, set at a value that characterizes a predetermined percentage of jobs as being critical, set at a value that characterizes a predetermined number of jobs as being critical, and so on. In the example method of FIG. 4, receiving (402) a predetermined criticality threshold may be carried out, for example, by the system management module (202) receiving a message that specifies the predetermined criticality threshold, by the system management module (202) reading the predetermined criticality threshold from a system configuration repository, and so on.

In the example method of FIG. 4, determining (208) whether the proximate computing components (216) are executing one or more critical jobs (218) can also include determining (404), by the system management module (202), whether a criticality level associated with each of the one or more jobs executing on the proximate computing component (216) exceeds the predetermined criticality threshold. In such an example, the criticality level associated with each of the one or more jobs executing on the proximate computing component (216) may be determined from metadata associated with the job, by performing a lookup in a table or other data repository that associates job identifiers with the criticality level of each job, and so on.

The example method of FIG. 4 also includes migrating (406), by the system management module (202), one or more non-critical jobs from the distant computing components (220) to the proximate computing components (216). As described above, one or more critical jobs (218) are migrated (212) from the proximate computing components (216) to one or more distant computing components (220). In order to offload some job processing from the distant computing components (220), which are now responsible for executing the one or more critical jobs (218), one or more non-critical jobs may be migrated (406) from the distant computing components (220) to the proximate computing components (216). Migrating (406) one or more non-critical jobs from the distant computing components (220) to the proximate computing components (216) may be carried out, for example, by pausing execution of the non-critical jobs on the distant computing components (220), copying application variables and other execution parameters associated with the one or more non-critical jobs, writing the application environment associated with the one or more non-critical jobs to memory in the one or more proximate computing components (216), and resuming execution of the one or more non-critical jobs at the point at which execution was halted on the distant computing components (220).

The example method of FIG. 4 also includes updating (408), by the system management module (202), a job placement algorithm to avoid placing critical jobs on the problem computing component and the proximate computing components until the problem computing component has been fully serviced. In the example method of FIG. 4, a job placement algorithm may be used to determine which computing component is responsible for executing various jobs. Such an algorithm may be designed to effectively load balance the processing load placed on each computing component and designed to account for additional factors. In the example method of FIG. 4, such an algorithm is updated (408) to avoid placing critical jobs on the problem computing component (214) and the proximate computing components (216) until the problem computing component (214) has been fully serviced, thereby eliminating the need to migrate critical jobs at a later time.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising a computer processor and a computer memory operatively coupled to the computer processor, the computer memory having disposed within it computer program instructions that, when executed by the computer processor, cause the apparatus to carry out the steps of:
   identifying a problem computing component in a computing system;
   identifying all proximate computing components in the computing system, wherein each proximate computing component is within a predetermined physical proximity of the problem computing component;

determining whether the proximate computing components are executing one or more critical jobs, wherein the one or more critical jobs are not executing on the problem computing component; and responsive to determining that the proximate computing components are executing one or more critical jobs migrating the one or more critical jobs to distant computing components in the computing system, wherein each distant computing component is not within the predetermined physical proximity of the problem computing component.

2. The apparatus of claim 1 wherein identifying a problem computing component in the computing system includes receiving a warning message associated with the problem computing component.

3. The apparatus of claim 1 wherein identifying a problem computing component in the computing system includes failing to receive a response from the problem computing component for a predetermined period of time.

4. The apparatus of claim 1 wherein identifying all proximate computing components in the computing system further comprises identifying all computing components in the computing system that share predetermined resources with the problem computing component.

5. The apparatus of claim 1 wherein determining whether the proximate computing components are executing one or more critical jobs further comprises:

receiving a predetermined criticality threshold; and determining whether a criticality level associated with each of the one or more jobs executing on the proximate computing component exceeds the predetermined criticality threshold.

6. The apparatus of claim 1 further comprising computer program instructions that, when executed by the computer processor, cause the apparatus to carry out the step of migrating one or more non-critical jobs from the distant computing components to the proximate computing components.

7. The apparatus of claim 1 further comprising computer program instructions that, when executed by the computer processor, cause the apparatus to carry out the step of updating a job placement algorithm to avoid placing critical jobs on the problem computing component and the proximate computing components until the problem computing component has been fully serviced.

8. A computer program product including a non-transitory computer readable storage medium wherein the non-transitory computer readable storage medium comprising computer program instructions that, when executed, cause a computer to carry out the steps of:

identifying a problem computing component in a computing system;

identifying all proximate computing components in the computing system, wherein each proximate computing component is within a predetermined physical proximity of the problem computing component;

determining whether the proximate computing components are executing one or more critical jobs, wherein the one or more critical jobs are not executing on the problem computing component; and responsive to determining that the proximate computing components are executing one or more critical jobs migrating the one or more critical jobs to distant computing components in the computing system, wherein each distant computing component is not within the predetermined physical proximity of the problem computing component.

9. The computer program product of claim 8 wherein identifying a problem computing component in the computing system includes receiving a warning message associated with the problem computing component.

10. The computer program product of claim 8 wherein identifying a problem computing component in the computing system includes failing to receive a response from the problem computing component for a predetermined period of time.

11. The computer program product of claim 8 wherein identifying all proximate computing components in the computing system further comprises identifying all computing components in the computing system that share predetermined resources with the problem computing component.

12. The computer program product of claim 8 wherein determining whether the proximate computing components are executing one or more critical jobs further comprises:

receiving a predetermined criticality threshold; and determining whether a criticality level associated with each of the one or more jobs executing on the proximate computing component exceeds the predetermined criticality threshold.

13. The computer program product of claim 8 further comprising computer program instructions that, when executed, cause the computer to carry out the step of migrating one or more non-critical jobs from the distant computing components to the proximate computing components.

* * * * *